(Model.)

C. H. OLSON.
COFFIN.

No. 256,496. Patented Apr. 18, 1882.

Witnesses
W. D. Krinkle
L. P. Graham

Inventor
Christopher H. Olson

UNITED STATES PATENT OFFICE.

CHRISTOPHER H. OLSON, OF DECATUR, ILLINOIS.

COFFIN.

SPECIFICATION forming part of Letters Patent No. 256,496, dated April 18, 1882.

Application filed January 25, 1882. (Model.)

*To all whom it may concern:*

Be it known that I, CHRISTOPHER H. OLSON, a citizen of the United States, residing at Decatur, in the county of Macon and State of Illinois, have invented certain new and useful Improvements in Coffins, of which the following is a specification.

My invention relates to coffin lids; and it consists in so arranging the glass with reference to a swinging plate that said glass may be either left over the face of the corpse or swung around under the swinging plate in a perfectly safe position.

In coffins as heretofore constructed, when the glass has been so attached as to admit its being removed from the coffin there has always been danger of breakage; and to overcome this difficulty in a cheap and practical manner is the object of my device.

Figure 1:
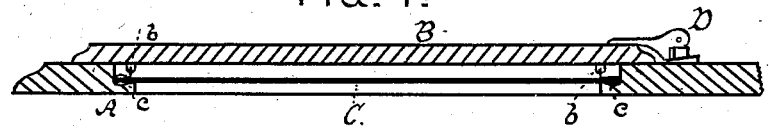
Figure 2:
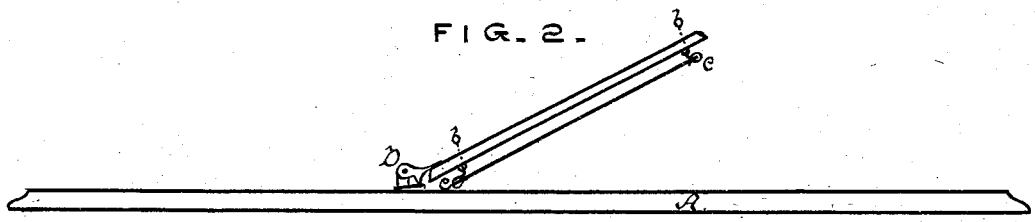
Figure 3:
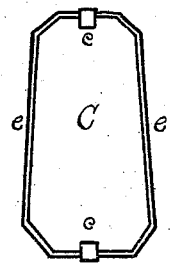
Figure 4:
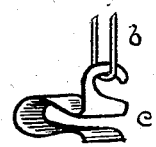

In the drawings accompanying and forming a part of this specification, Figure 1 is a transverse section of my device. Fig. 2 is a side view of a coffin-lid, showing the plate carrying the glass thrown back, leaving the face of the corpse exposed. Fig. 3 is an outline of the glass, showing the device used to connect with the swinging plate and the border or frame around the same. Fig. 4 further represents the device used to connect the glass with the swinging plate.

A is the coffin-lid. B is the swinging plate. C is the glass. *b b* are hooks on the swinging plate that engage devices *c c* on glass C. D is a device connecting the swinging plate with the coffin-lid. This device is so constructed that plate B may be swung around in either direction and retained in the position shown in Fig. 2. *e* is the frame on the glass.

Hooks *b b* are so constructed that they engage devices *c c* and raise the glass when the plate is swung in one direction only. When swung in the opposite direction the plate becomes disengaged from the glass, and may be carried around, as shown in Fig. 2, leaving the glass over the face of the corpse. There is no adjustment necessary. When both plate and glass are to be raised the plate is swung to one side. When the plate alone is to be raised it is swung to the other side far enough to disengage it from the glass, when it may be slightly raised and carried around in either direction.

I prefer to make the border *e* of tin-foil, which may be so attached as to form a neat border, concealing the rough edges of the glass.

What I claim is—

The combination of the lid furnished upon its under side with hooks with the glass frame furnished with corresponding loops, by which the two may be connected at will, as set forth.

CHRISTOPHER H. OLSON.

Attest:
L. P. GRAHAM,
M. D. KUNKLE.